(12) United States Patent
Matsuura (10) Patent No.: US 6,286,037 B1
(45) Date of Patent: *Sep. 4, 2001

(54) DATA COMMUNICATION SYSTEM, DATA COMMUNICATION METHOD, DATA RECEIVER AND DATA RECEIVING METHOD

(75) Inventor: Yoko Matsuura, Tokyo (JP)

(73) Assignee: Sony Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,980

(22) Filed: Apr. 23, 1998

(30) Foreign Application Priority Data

Apr. 30, 1997 (JP) ...................................... 9-112848

(51) Int. Cl.[7] .................................................. G06F 15/177
(52) U.S. Cl. .............................. 709/220; 709/221; 713/1
(58) Field of Search ................................... 709/217, 219, 709/220, 221, 222; 340/825; 710/1, 104; 713/1; 395/712

(56) References Cited

U.S. PATENT DOCUMENTS

| | | | | |
|---|---|---|---|---|
| 5,666,293 | * | 9/1997 | Metz et al. | 709/220 |
| 5,801,750 | * | 9/1998 | Kurihara | 348/7 |
| 5,884,045 | * | 3/1999 | Kurihara | 709/237 |
| 5,951,639 | * | 9/1999 | MacInnis | 709/217 |
| 5,995,726 | * | 11/1999 | Dillon | 709/231 |

* cited by examiner

Primary Examiner—Zarni Maung
(74) Attorney, Agent, or Firm—Lerner, David, Littenberg, Krumholz & Mentlik, LLP (57) ABSTRACT

A virtual environment desired by a user is set in a list. Program information is received and supplied to a program specification getting portion, and a program is received and supplied to a capture portion. When the program supplied to the capture portion is confirmed to match with the list as a result of comparison between the list and the program information, the program is stored in a buffer. Instructions for installing the program are acquired from the program information in an install instruction getting portion, and the program is installed by a virtual environment setting portion. If a resource necessary for starting up the program is not found by a check of system resources by a system resource checking portion, an instruction is sent to a communication port to receive the necessary resource.

12 Claims, 8 Drawing Sheets

| ITEM | CONTENT |
|---|---|
| PROGRAM NO. | 100 |
| PROGRAM PROVIDER NAME | ABCD |
| PROGRAM PROVIDER ADDRESS | 43. xy. 2, or 6-7-35 × × × . . . |
| HOW TO FETCH PROGRAM | × × × × |
| | TRANSPONDER 5 |
| | CHANNEL 200 |
| | 1996.2.21 10:00-10:30 |
| | DATA TRANSMISSION BY × × × |
| | or ftp://43. X. Y. Z. //ABCDABCD/ |
| OPERATION LEVEL | APPLICATION LEVEL |
| REQUIRED USER LEVEL | ADVANCED USER |
| WIDE CATEGORY | SOFTWARE DEVELOPMENT TOOL |
| MEDIUM CATEGORY | C COMPILER |
| PROGRAM SIZE | 1. OMB |
| OS | any( × × × , × × × , × × × , etc. . . ) |
| FORMAT | SOURCE |
| PROGRAM NAME | BCDEF |
| REQUIRED RESOURCES | × × × , × × × × , . . . |
| INSTRUCTION TO INSTALL | 1. DECOMPRESS BY × × × , |
| | . . . . |

| ITEM | CONTENT |
|---|---|
| PROGRAM NO. | 101 |
| PROGRAM PROVIDER NAME | CDEFG |
| PROGRAM PROVIDER ADDRESS | 42. a. b. c |
| HOW TO FETCH PROGRAM | x x x x |
| | TRANSPONDER 7 |
| | CHANNEL 100 |
| | 1996. 2. 21 11:00-11:30 |
| | DATA TRANSMISSION BY x x x |
| | or ftp://42. a. b. c. //CDEF/ |
| OPERATION LEVEL | APPLICATION LEVEL |
| REQUIRED USER LEVEL | ADVANCED USER |
| WIDE CATEGORY | WORD PROCESSOR |
| NARROW CATEGORY | JAPANESE WORD PROCESSOR |
| PROGRAM SIZE | 1. 2MB |

22 points to PROGRAM NO. row

DATA COMMUNICATION SYSTEM, DATA COMMUNICATION METHOD, DATA RECEIVER AND DATA RECEIVING METHOD

BACKGROUND OF THE INVENTION

1. Field of the Invention

This invention relates to a data communication system, data communication method, data receiver and data receiving method configured to automatically construct a user's virtual environment on the basis of data transmitted through a communication path.

2. Description of the Related Art

Computers and other information devices, and especially personal computers, have recently been distributed in large number. In general, a user must install desired software, i.e. computer programs, in a computer to use the software on the computer. Although many computers in the market are already installed with predetermined computer programs, later operations for updating the programs, or the like, rely on users' own tasks.

As computer programs become more and more sophisticated and multi-functional, there is the tendency of composing each program using fractional components to permit individual users to install selective components necessary for their desired functions and to thereby alleviate loads on hard discs, memories and other resources in computers.

Additionally, computer networks represented by the Internet are expanding. Moreover, many computer programs are now provided and installed in computers by down-loading through networks. In most cases, also for alleviating the load to networks, only the necessary parts of the component-type computer programs are down-loaded, On the other hand, when receiving satellite broadcasting, for example, an IRD (Integrated Receiver Decoder) is used to effectuate conditional access to the broadcast. The IRD includes a tuner designating a reception transponder, a demodulator, a descrambler, a demultiplexer for designating separated packets, an image decoder and an audio decoder, among others, to control the selective supply of programs to individual users, for example. The IRD has a built-in CPU and a controller including RAM and ROM, and is controlled by software written in ROM.

Also, in the IRD, the software is occasionally renewed (up-graded) to cope with changes or renewal of broadcasting programs made on the part of the station, new services, and changes in key information for descrambling, for example. Concerning such renewal of IRD software, it is proposed to transmit the program data through the satellite broadcasting waves to be down-loaded by the IRD and to be written in ROM by a predetermined loader program. In this manner, it is sufficient for a user to request down-loading of the new-version of software, and the software is renewed automatically in his IRD.

As referred to above, operations for installing software in computers or up-grading software have relied on manual tasks of users. These jobs are troublesome, and occasionally cause mistakes.

Further, many computer programs down-loaded through networks require another particular computer program for installing them successfully. If a user does not have the particular computer program required for the install, the particular program must also be down-loaded. Additionally, it takes much time and labor to construct the user's necessary environment for his purpose.

Moreover, there are large differences in skill level of users of computers or other information devices. For example, a computer program may include functions which beginners will never use. Nevertheless, beginners are compelled to install the full program including modules for undesired functions, this results in wasting resources.

Also for high-grade users, there is the problem that they have to install the software using the same procedure as beginners do, and they have additional jobs after the install to construct their desired environments, such as deletion of unnecessary files, for example.

In the case of IRD, users could have the software down-loaded loaded and installed automatically by performing predetermined operations. In this case, however, new version software is merely provided, and it is impossible to have only user's desirable portions selectively down-loaded and installed.

OBJECTS AND SUMMARY OF THE INVENTION

It is therefore an object of the invention to provide a data communication system, data communication method, data receiver, and data receiving method configured to transmit data according to individual users' requests and skill levels and to automatically construct virtual environments suitable for individual users without relying on users' operation.

According to the invention, there is provided a data communication system, comprising: a sender system for transmitting program data and for transmitting program information which is information data on the program; a receiver system receiving the program data and the information data, and including capture means for selectively introducing the program data in accordance with the program information and a predetermined virtual environment, install instruction getting means for acquiring install instructions of the program data introduced by the capture means from the program information, resource checking means for checking available resources, and install means responsive to a checking result by said resource checking means to judge whether the program data introduced by the capture means is usable or not and to automatically install the program data introduced by said capture means following to said inntall instructions acquired by the install instruction getting means when the program data is confirmed usable; and a communication path for delivering the program data and the program information from the sender system to the receiver system.

According to the intention, there is also provided a data communication method comprising the steps of: transmitting program data and for transmitting program information which is information data on the program data from a sender system to a receiver system; receiving the program data and the information data in the receiver system; selectively introducing the program data in accordance with the program information and a predetermined virtual environment; acquiring install instructions of the program data introduced from the program information; checking available resources; and, in response to the checking result, judging whether the program data is usable or not, and automatically installing the program data following to the install instructions when the program data is confirmed usable.

According to the invention, there is also provided a data receiver apparatus configured to receive program data and program information which is information data on the program data, comprising: capture means for selectively introducing the program data in accordance with the program information and a predetermined virtual environment; install instruction getting means for acquiring install instructions of the program data introduced by the capture means from the program information; resource checking means for checking available resources; and install means responsive to a checking result by the resource checking means to judge whether the program data introduced by the capture means is usable or not and to automatically install the program data introduced by the capture means following to the install instructions acquired by the install instruction getting means when the program data is confirmed usable.

According to the invention, there is also provided a data receiving method for receiving program data and program information which is information data on the program data, comprising the steps of: selectively introducing the received program data in accordance with the received program information and a predetermined virtual environment; acquiring install instructions of the program data introduced from the program information; checking available resources; and, in response to the checking result, judging whether the program data is usable or not, and automatically installing the program data following to the install instructions when the program data is confirmed usable.

In any aspect of the invention summarized above, received program data is selectively introduced on the basis of a given preset virtual environment and transmitted program information, and the introduced program data is automatically installed according to an install instructions obtained from the program information as a result of searches to the software resources. Therefor, any virtual environment of a receiver system can be automatically constructed to meet any user's requirement.

The above, and other, objects, features and advantage of the present invention will become readily apparent from the following detailed description thereof which is to be read in connection with the accompanying drawings.

DESCRIPTION OF THE PREFERRED EMBODIMENTS

Figure 1A:
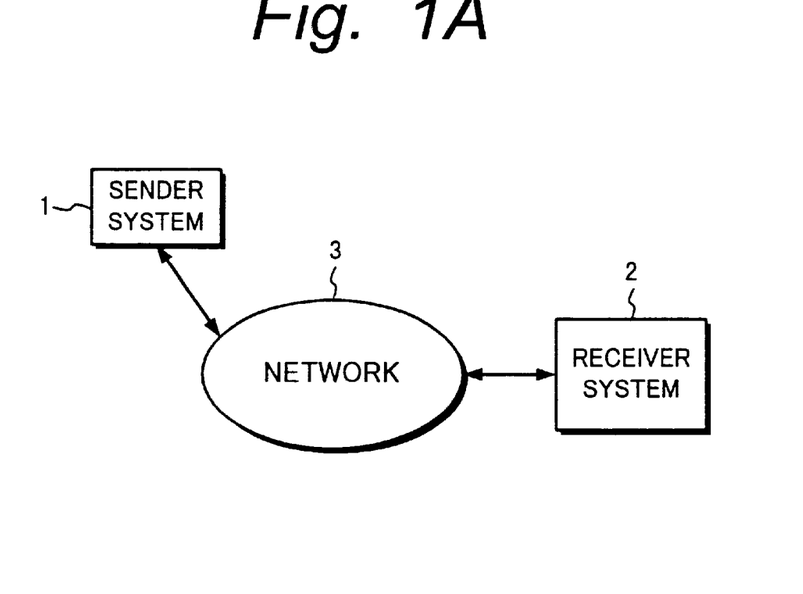
FIGS. 1A and 1B are schematic diagrams showing embodiments of the invention.
Figure 1B:
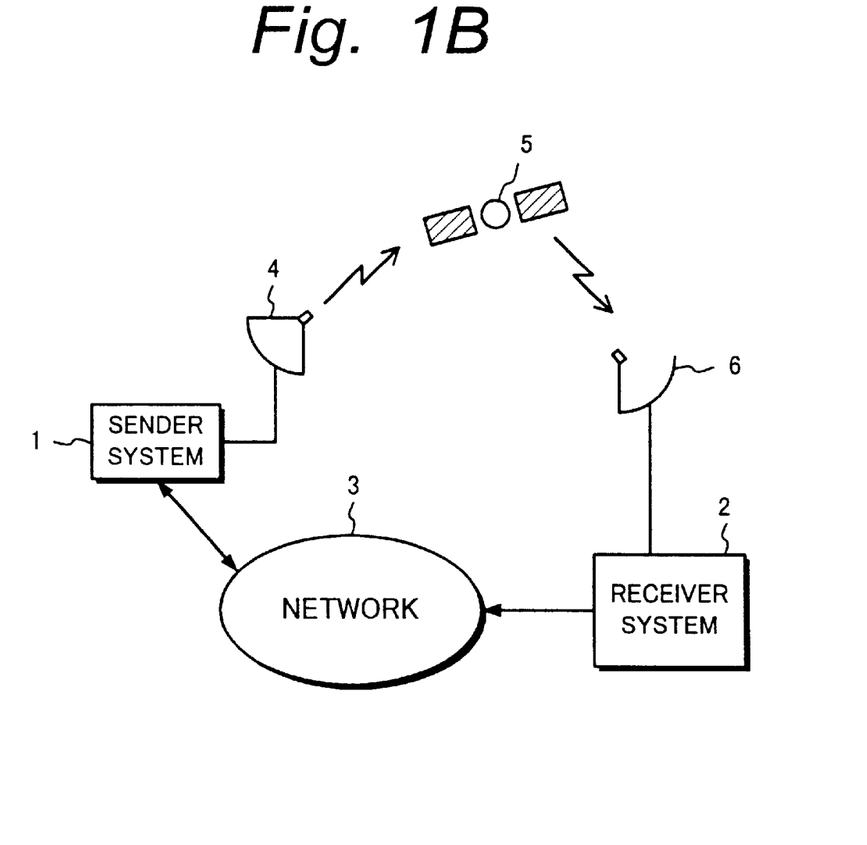

Explained below are embodiments of the invention with reference to the drawings. FIG. 1A shows an example in which a sender system 1 for supplying services and a receiver system 2 requesting and receiving services are connected by a network 3 such as the Internet. FIG. 1B shows an example in which the sender system and the receiver system 2 are connected by both the network 3 and an satellite broadcasting through a communication satellite 5, for example.

In the example of FIG. 1A, the receiver system 2 is a computer, for example, and requests predetermined services from the sender system 1 through the network 3. When the sender system 1 receives the request, the requested services are supplied to the receiver system 2. For example, the receiver system 2 sends a request of down-loading software, for example, to the sender system 1, the receiver system 2 can receive the service of down-loading the software from the sender system 1.

In the example of FIG. 1B, the receiver system 2 has an antenna 6 and IRD (not shown) referred to above. The sender system 1 has predetermined transmission facilities, and data from the sender system 1 is transmitted from a transmission antenna 4 and delivered by satellite communication or broadcasting via the communication satellite 5. In a typical digital broadcasting system, the sender system 1 has a MPEG2 (Moving Pictures Expert Group 2) encoder and a transmission system.

In the sender system 1, transmission data is compressed by the MPEG2 encoder, and the compressed data is packed in packets of the length of 188 bytes. Packets of a plurality of data are multiplexed to form MPEG2 transport packets. In the header of a packet, information showing the content of the packet is stored. A chain of transport packets forms a transport stream. The number of transport streams corresponds to the number of transponders equipped in the communication satellite.

In the sender system 1, predetermined treatments are applied to MPEG2 transport packets, such as scrambling each packet, error correction coding of each packet, modulation, and so forth, and a modulated output is transmitted from the transmission antenna 4. The communication satellite 5 has mounted a plurality of transponders. These transponders share predetermined frequency bands different from each other. The transmission speed of each transponder is, for example, approximately 27 Mbit/sec.

By receiving and decoding the waves, the receiver system 2 can down-load software. It is also possible to establish communications between the receiver system 2 and the sender system 1 through the network 3. In the system shown, communication through the network 3 can be omitted. Also in this example, the receiver system 2 may be a TV receiver having IRD and means for connection to the network 3.

Figure 2:
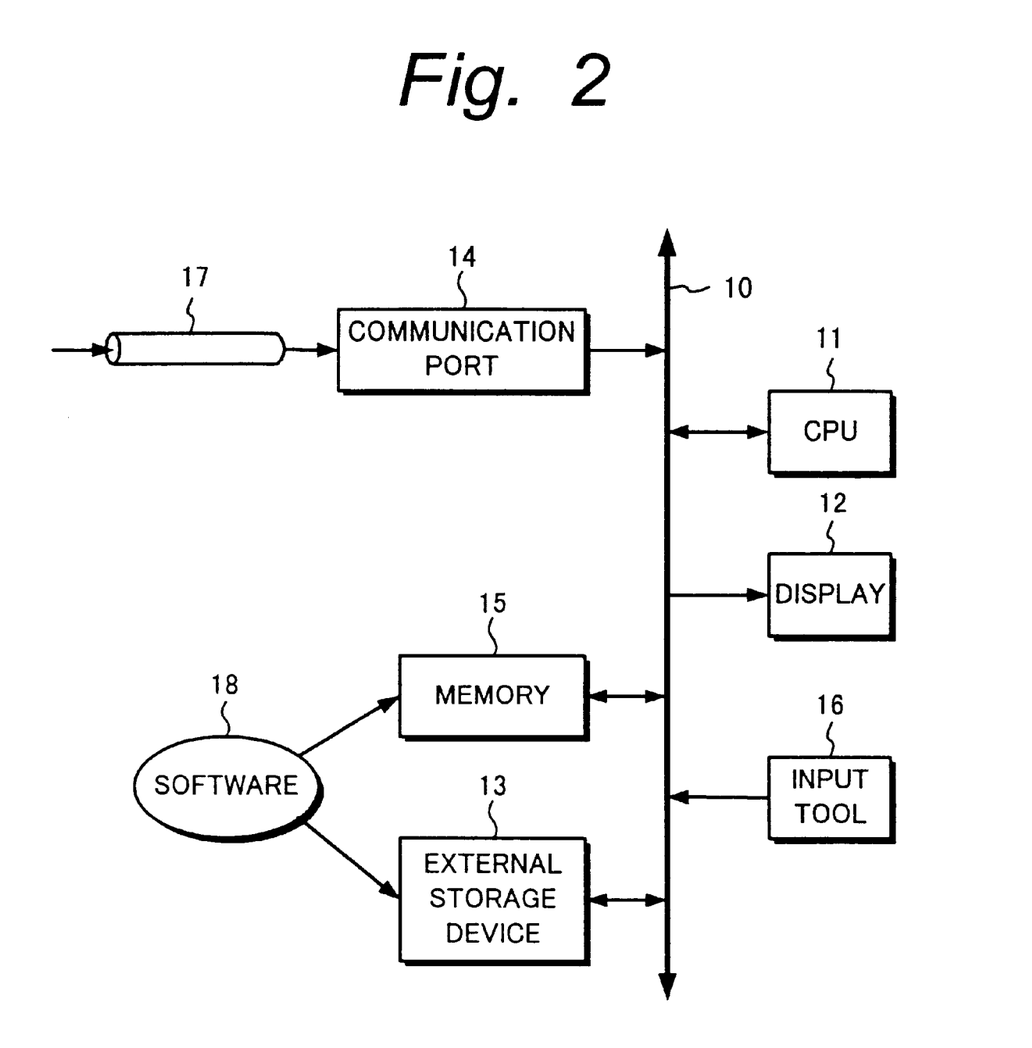
FIG. 2 is a block diagram schematically showing a construction of a receiver system.

FIG. 2 schematically show a construction of the receiver system 2 in the case where the receiver system 2 is a computer. Connected to a bus 10 are CPU 11, display 12, external storage device 13, communication port 14, memory 15 and input device 16.

The display 12 may be a CRT or a liquid crystal display (LCD). The input device 16 may be a keyboard, mouse and/or tablet. Also a microphone may be used as the input device 16 to accept speech signals.

The communication port 14 is connected to a predetermined communication path 17 to establish an interface for communication between the receiver system 2 and the communication path 17. For example, when the communication path 17 is the network 3 and the receiver system 2 is connected thereto via an analog public telephone line, the communication port 14 is a modem. If the communication path 17 is for satellite broadcasting or communication using the communication satellite 5, then the communication port 14 is an IRD. The IRD contains a tuner designating a receiving transponder, a demodulator, a descrambler, a demultiplexer for designating separated packets, an image decoder, an audio decoder, and so forth.

Memory 15 is a system memory region of the apparatus, which may be ROM or RAM. RAM is used as a work area of CPU 11. Usable as the external storage device 13 are a hard disc drive, magneto-optic disc, CD-ROM, DVD (digital versatile disc) floppy disc drive, and so on. Also a large-capacity RAM or ROM can be used as the external storage device 13, In this case, the memory 15 and the external storage device 13 can be used commonly. In the case where the external storage device 13 is a rewritable storage medium, it can be used as a part of the system memory region.

Software programs 18 are stored in the external storage device 13 and memory 15. The software programs 18 involve application programs and an operation system. ROM in the memory 15 stores a basic software program of the system and information for identifying the system.

When the computer is started up, various kinds of software programs 18 are loaded from the external storage device 13 and the memory 15. The, images prepared by the software programs 18 appear on the display 14, and the computer is ready to accept entry of signals through the input device 16. Thus, an environment for a user to do predetermined jobs is constructed on the computer. The environment constructed on the computer is called a virtual environment, and it can be replaced by changing the software 18 or data on request by the user, for example.

Even when the receiver system 2 is not a computer but a TV receiver having a connected IRD or means for connection to the network 3, it can be arranged in substantially the same manner. An arrangement for receiving TV broadcasts and displaying image on the display 12 may be readily added to the arrangement shown in FIG. 2. This may be realized by converting image outputs to the display 12 into a signal suitable for images on the TV receiver and supplying it to the TV receiver.

In the construction explained above, data is transmitted from the sender system 1 to a predetermined transponder in the communication satellite 5. The data is received by the receiver system 2 through the antenna 6. Then, predetermined processes are applied to the data by the communication port 14 composed of the IRD, for example, to demodulate and decode it. Data output from the communication port 14 is sent to the memory 15 via the bus 10 and is stored. The data is thereafter stored in the external storage device 13 when necessary.

In this embodiment, program data for realizing predetermined software is sent from the sender system 1, and program information concerning the program data is also sent. On the other hand, in the receiver system 2, requirements for constructing the virtual environment the user desires on the receiver system 2 are input as parameters, and they are stored in the external storage device 13 or the memory 15, for example, as a user's deniable setting list.

In the receiver system 2, the program information received from the sender system 1 is compared with the user's desirable setting list, and necessary program data selected with reference to the result of the comparison is down-loaded. In the receiver system 2, conditions are set in the user's desirable setting list, whether the user is a highly skilled user or a beginner, whether the user owns additional particular program data (or complimentary program data) required for execution of the particular program data, and so on, and based on the setting, the program data is selectively down-loaded.

Figure 3A:
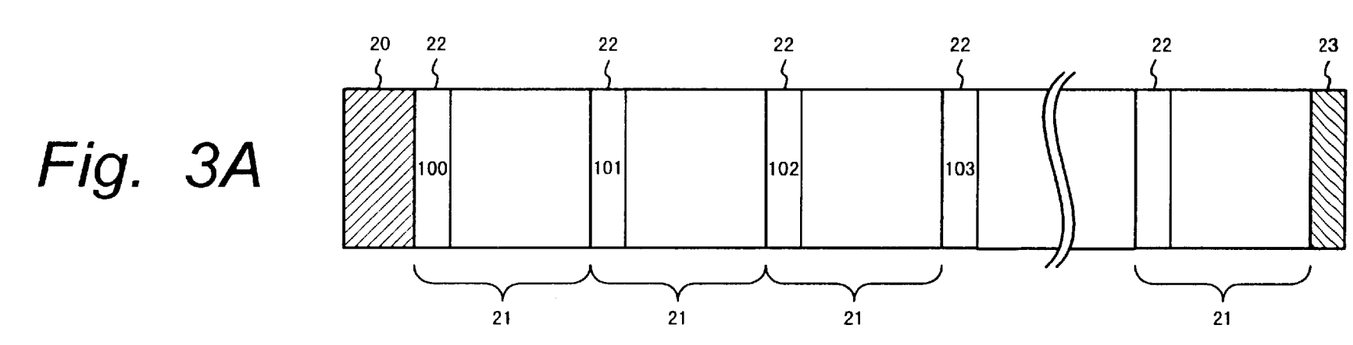
FIGS. 3A ad 3B are schematic diagrams conceptionally showing arrangements of transmitted program data and program information.
Figure 3B:
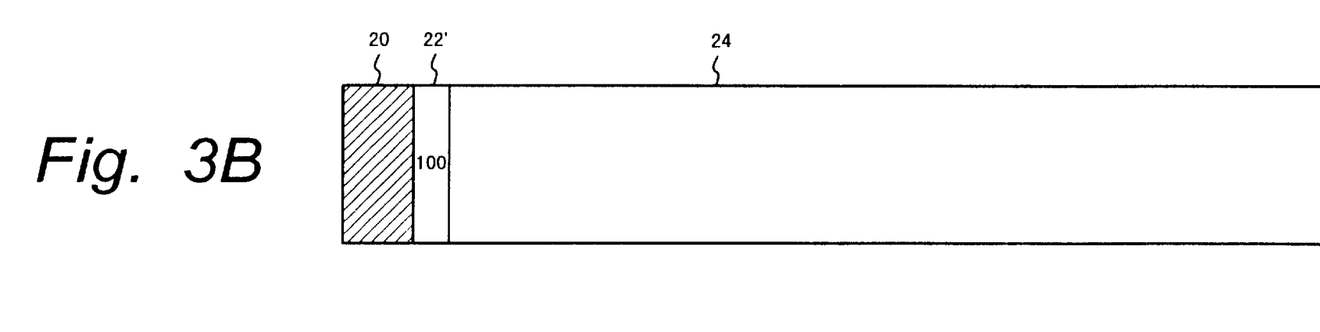

FIGS. 3A and 3B conceptionally show transmitted forms of program data and program information transmitted from the sender system 1. FIG. 3A shows a transmitted form of program information. In the header 20, information indicating that the data is program information is stored. Subsequent to the header 20, pieces of program information 21 are stored successively. In an initial segment of each piece of program information 21, a program number 22 is stored as an index for identifying the program data indicated by the program information 21. At the end, end data 23 indicating the end of the data is added. The program information from the header 20 to the end data 23 is divided into packets, and the packets with predetermined headers are transmitted.

FIG. 3B shows a transmitted form of program data. In the header 20, information indicating that the data is program data is stored. A program number 22' corresponds to the program number 22 of the program information. The major part of the program data is stored in a region 24. The major part of the program data can be transmitted in the form of divisional parts assigned with different program numbers 22' from each other, for example. Since information indicating the program size is stored in the program information 21, data indicating the end of the data need not be added to the program data. Like the program information, also the program data is divided into packets, and the packets with predetermined headers are transmitted.

The program information and the program data are transmitted in different frequency bands, for example, and repeated by different transponders in the communication satellite 5. It is also possible to transmit them in a common frequency band and to repeat with a single transponder. The program information and the program data are transmitted repeatedly within a predetermined duration of time. It is also possible to repeatedly transmit a plurality of different data. For example, a plurality of program data of the same software but different in version, which are labeled individually with their respective program numbers, may be transmitted repeatedly within a predetermined duration of time.

Figure 4:
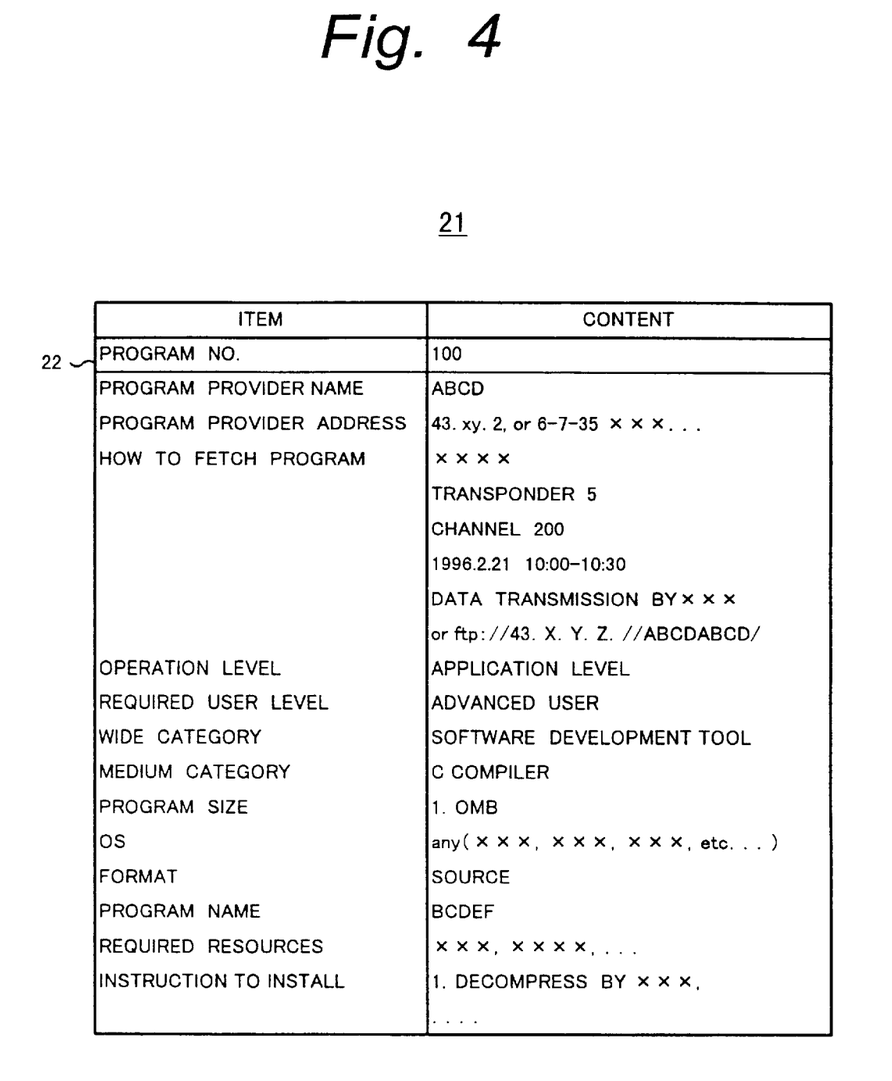
FIG. 4 is a schematic diagram showing an example of program information.
Figure 5:
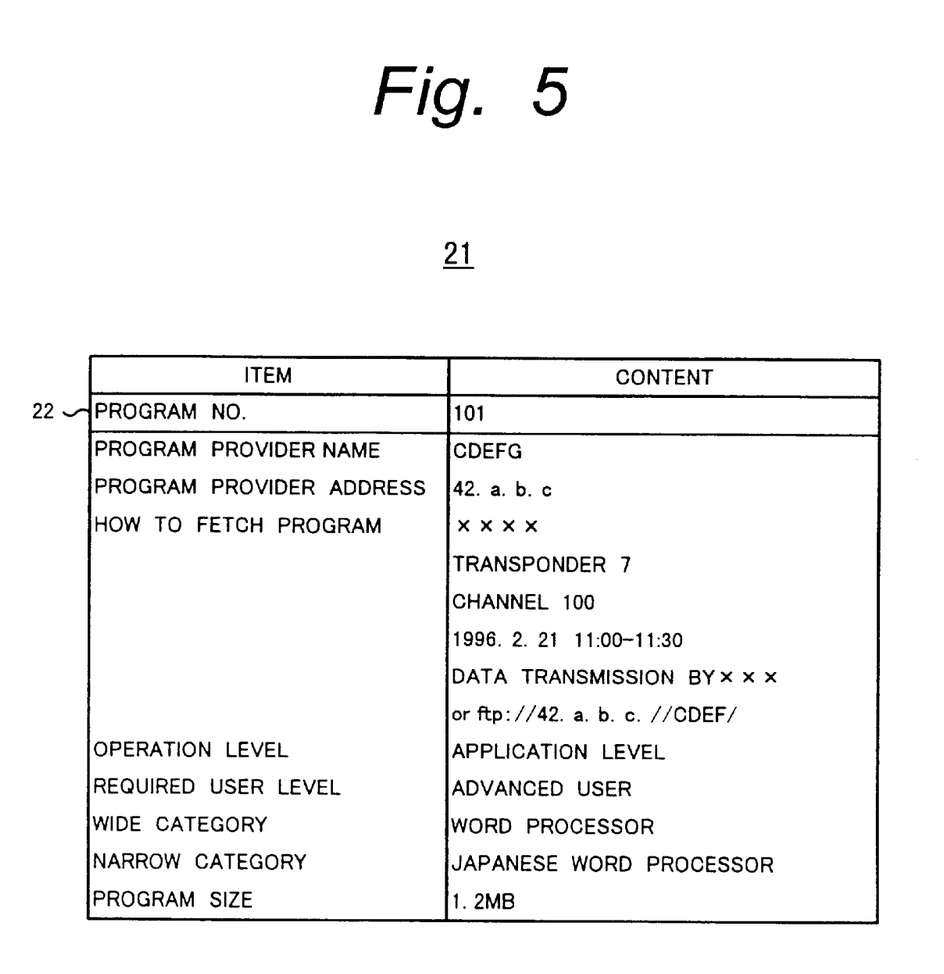
FIG. 5 is a schematic diagram showing an example of program information.

FIGS. 4 and 5 show different examples of program information 21. FIG. 4 shows an example of the program information 21 containing more information than shown in FIG. 5. The program information of FIG. 4 is prepared on an assumption that the program data indicated by the program information 21 (hereinafter called "the particular program data") will be down-loaded by highly skilled users. The particular program data shown here is a compiler for developing programs.

In FIG. 4, "Program No." at the top is the program number 22. In this example, the program number 22 of the particular program data is "100". Subsequently, the name of the provider of the program data corresponding to the program number and the address of the provider of the program are stored. If the program provider has an address on the network 3, the network address (IP address when the network 3 is the Internet) is additionally stored as the program provider address.

The next item, "how to fetch program", indicates the date and the channel of a broadcast if the program can be down-loaded via satellite, or a site where the program can be down-loaded if it can be down-loaded through the network 3. For example, it is indicated that the particular program data will be transmitted from XXXX broadcasting station, by satellite broadcasting through channel No. 200, via the fifth transponder in the communication satellite 5( from 10:00 to 10:30 on Feb. 21, 1996. It is additionally indicated that the particular program data can be down-loaded from the address "ftp://43.x.y.z./ABCDABCD/" through the network 3.

"Operation Level" means the software hierarchical level of the particular program data. In this item, a hierarchical level from the viewpoint of a software classification is identified, for example whether the particular program data is of the application level, device driver, or operation system level. In this example, it is shown as being in the application level. "Required User Level" pertains to a skill level (with respect to the system using the particular program data) which a user is required to have. In this item, indication is made as "beginner", "medium user" or "advanced user", depending on the skill level required. In this example, an advanced level is required for the particular program data.

"Wide Category" and "Medium Category" describe which kind of program that the particular program data adheres. An additional item, "Narrow Category", may be added to the former two categories. Any two categories may be combined among the three categories. In this example, these items describe that the particular program data is a software development tool and, in particular, a C language compiler.

The next item, "Program Size", indicates the size of the particular program data in bytes. Referring to the "Program Size", it is known whether down-loading is completed when the program data set forth in the program information is down-loaded.

The terms "OS" is the abbreviation for Operating System, and indicates on which operating system the particular program data is operative. Tf it is operative on different operating systems, the operating systems are described.

The item "Format" indicates in which form the particular program data is down-loaded. For example, either "source" or "binary" is indicated. When "source" is indicated, like this example, the program data is down-loaded in form of non-compiled source codes. In this case, the user must have means for compiling the source codes. Information on compile means is indicated in a later item, "Required Resources". When "binary" is indicated, the program data is down-loaded in form of the actual execution file, and no compile means in required.

The item "Program Name" indicates the name of the particular program data. The next item, "Required Resources", indicates software resources necessary for installing and actually using the particular program data. Together with this, it is indicated how to get the resources. As to the procedure for getting the resources, indication may be made only on resources which are not readily available.

In this example where the program data is supplied in form of source codes, the name of compile means (compile program) is indicated in the item "Required Resources". If, for example, the program data is compressed by a predetermined method, the name of software necessary for recovering the source codes is shown. It is also possible to indicate here the minimum hardware environment, such as memory capacity, which is required for executing the program data.

The item "Instruction to Install" describes the process for installing the particular program data.

FIG. 5 shows another example of the program information 21. In this example, as compared with FIG. 4, a category is omitted from "Program No. (in this example, "medium category" is omitted, and more specific "narrow category" is indicated), and items up to "Program Size" are identical.

These items of the program information 21 may be different for different kinds of software and systems. For example, if the receiver system 2 is a TV receiver equipped with an IRD, there is a restriction in the category of software to be down-loaded and in the environment for using it. In this case, the program information may include items other than those shown in FIGS. 4 and 5. Possible items of the program information are, for example, the font size to be displayed (large, medium, small), expected or required user level (for elder user, young users), operation speed (which is important, the response or the function), and whether EPG (Electrical Program Guide) is necessary or not.

On the other hand, in the receiver system 2, the user enters his desirable setting through the input device. Items set by the user's desirable setting correspond to at least some items in the program information 21. The user can enter his desirable setting to all or appropriately selected items of the program information.

In the receiver system 2, the user's desirable setting is entered for respective items through the input, device 16. The user's desirable setting is stored in the memory 15 as a user desirable setting list. Alternatively, the input user desirable setting list may be stored in the external storage device 13. It is also possible to supply a user desirable setting list from a exchangeable storage medium, such as floppy disc or CD-ROM. In another configuration, it is possible to obtain the user desirable setting list, itself, through the network or satellite broadcasting.

In the user desirable setting list, items for a plurality of different program data can be entered. Similarly, a plurality of user desirable setting lists can be stored in the memory 15.

Figure 6:
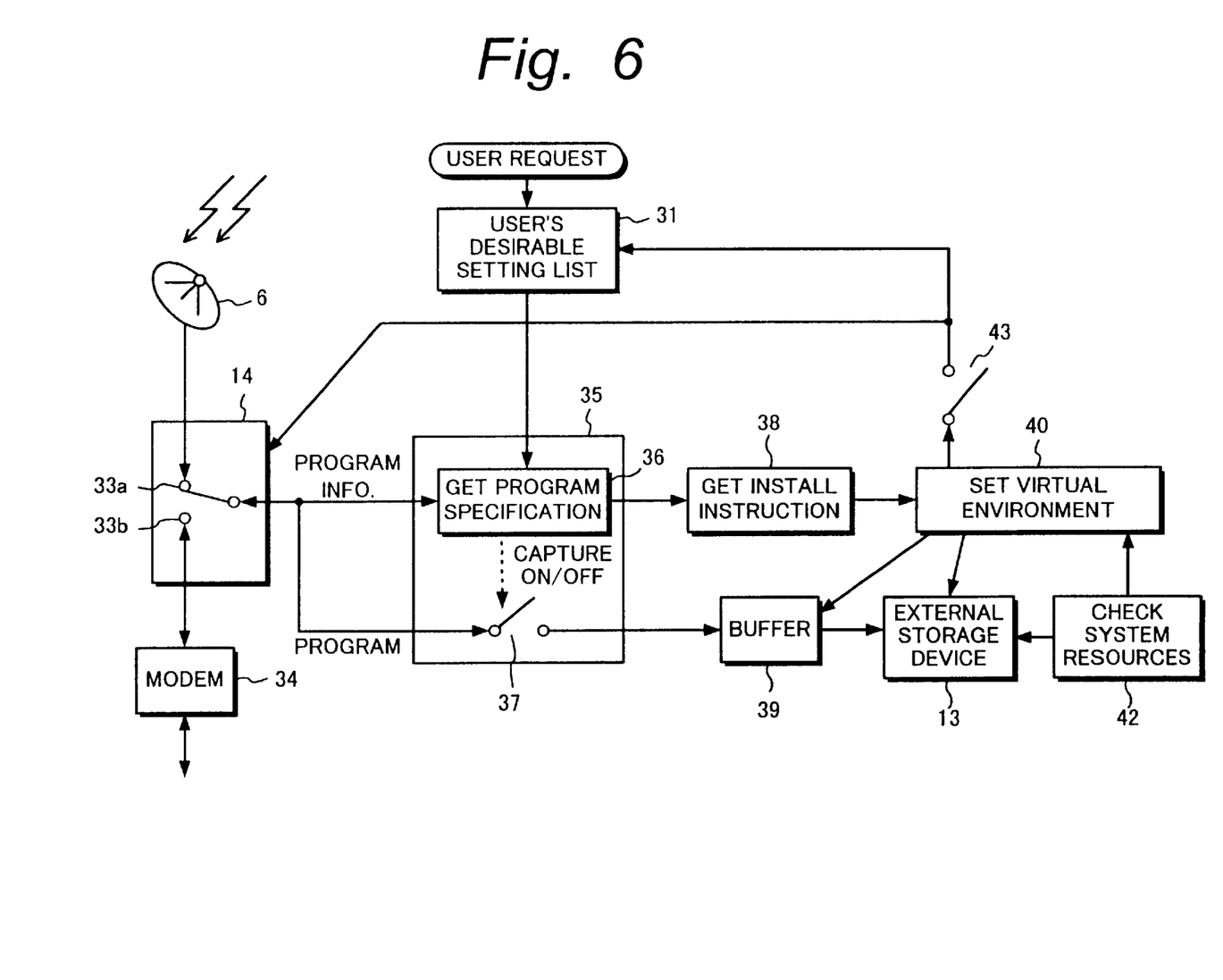
FIG. 6 is a block diagram showing functions of a receiver system according to an embodiment.

FIG. 6 is a block diagram showing functions of the receiver system 2 according to the embodiment. It corresponds to the arrangement of the receiver system 2 shown in FIG. 2, and each functional portion can be implemented using CPU 11, memory 15, and so forth. With reference to FIG. 6 and the flow chart shown in FIGS. 7 and 8, the process for down-loading a program data according to the embodiment is now described. In the flow chart shown in FIGS. 7 and 8, marks A and B indicate that the process is continuous to the same marked portion. Let the user desirable setting list 31 be previously prepared based on a user's request and stored in the memory 15.

Figure 7:
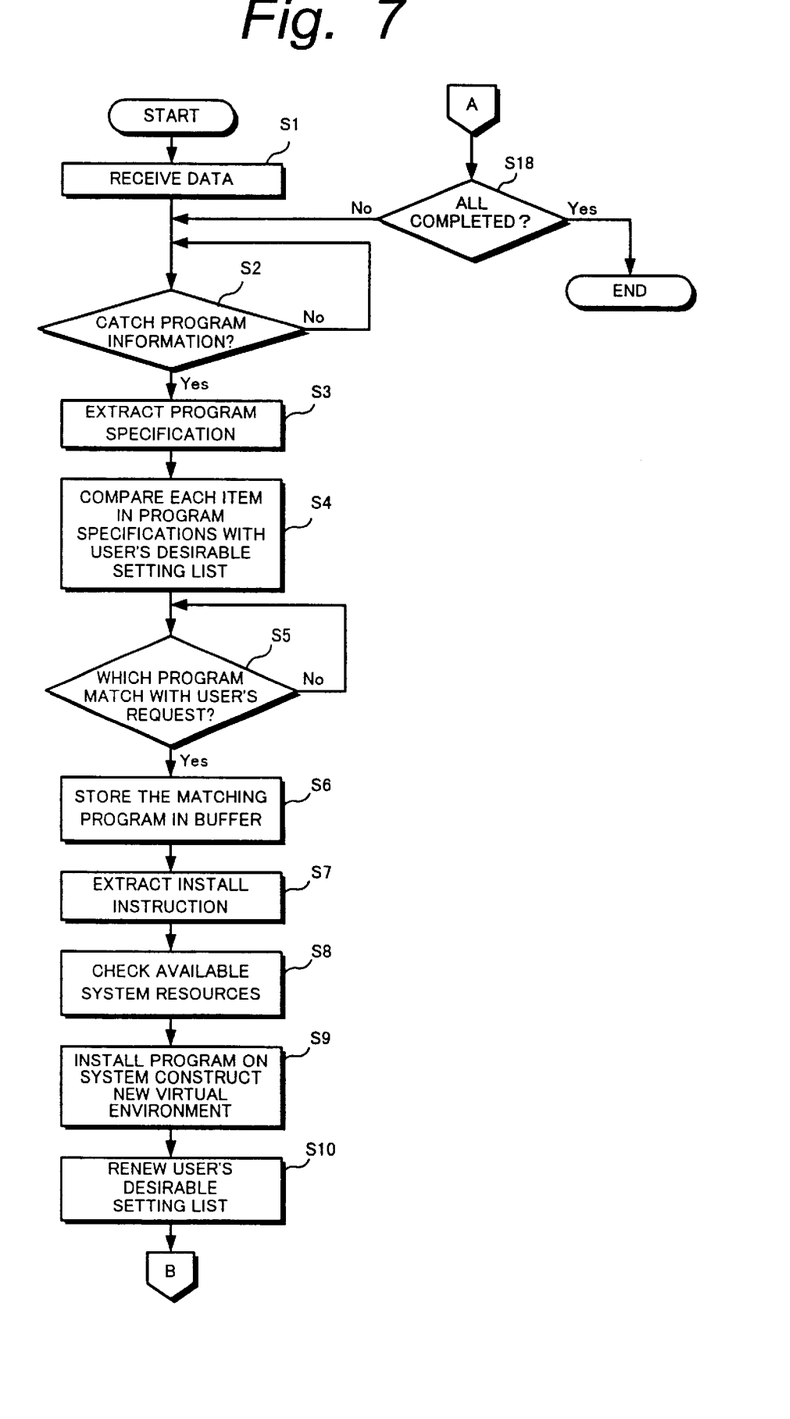
FIG. 7 is a flow chart of a process of down-loading program data according to an embodiment.

In step S1, data is received at the antenna 6 as a broadcast, for example, and supplied to the communication port 14. Signals from the communication port 14 are subjected to necessary processing, such as demodulation and decoding, and are supplied in the form of digital data to a terminal 33a in a switch portion 33 within the communication port 14. If the system can be connected to the network 3, a modem 34 is connected to the communication port 14. The input and output of the modem 34 are connected to a terminal 33b of the switch portion 33. Data can be received also through the modem 34 via the network 3. The switch portion 33 changes a connection between terminals 33a and 33b depending on the communication path.

Data received at the communication port 14 is judged, with reference to the header 20, whether it is a data composed of program information 21 or a program data. If it is a data composed of program information 21, the data is supplied to a program specification getting portion 36 in the capture portion 35, and individual pieces of the program information 21 are acquired (step S2). The acquired program information 21 is stored in the memory 15.

A capture control switch portion 37 is controlled based on the information obtained in the program specification getting portion 36. In the program specification getting portion 36, program specifications of individual program data are extracted from individual pieces of supplied program information 21 (step S3). The program specification is composed of items of the program information 21 shown in FIGS. 4 and 5.

In the next step S4, individual items of the program specification are compared with items in the user desirable setting list previously prepared and stored in the memory 15 for each program information corresponding to each program data. In the next step S5, a search is made to check whether the program information 21 matching with the user desirable setting list exists or not. If it exists, the program number 22 written in the program information 21 is extracted (let it be No. P), and the process moves to the next step S6.

In step S6, the program data having No. 9 as the program number 22 is received according to "how to fetch program" indicated in corresponding program information 21. For example, the communication port 14 is prepared for receiving data until the transmission time, and at the transmission time, setting the reception transponder and the reception channel, reception is started. In the designated duration of time, all other program data may be transmitted. Therefore, it is checked in the capture portion 35 whether the data is just the particular program data and has No. P from the header 20 and the program number of the received data.

When the received data is confirmed to be the program data having the program No. P, the capture control switch portion 27 is closed to ON. Then, the program data is captured and stored in the buffer 39 which is a region provided in the memory 15.

For example, in the case where the "Required User Level" in the user desirable setting list is set as "Advanced User" and the other items are not set, all of the program data in the received program data requiring "Advanced User" as the "Required User Level" are introduced into the buffer 39. By setting more items in the user desirable setting list, more specified program data alone can be introduced into the buffer 39.

For example, if the user is an advanced user and wants to construct a virtual environment for development of programs, the user can obtain only desired program data by setting the "Requires user Level" as "Advanced User and "Category" as "Software Development Tool".

In the next step S7, "How to Install Program" is extracted from the program information 21 numbered P and stored in the memory 15, and is supplied to the install instruction getting portion 38. In the next step S8, the system resource check portion 42 checks available resources (system resources) in the system. The obtained system resource information is stored in a predetermined region of the memory 15, for example. The system resources may alternatively be previously checked and stored in the memory 15 immediately after the power is supplied to the system, for example.

In step S9, the program data captured in step S6 is automatically installed in the system. This is done by a virtual environment setting portion 40 which follows the install instruction supplied to and acquired by the install instruction getting portion 38 in step S7. The program data introduced into the buffer 39 is read out, and processing described in the install instruction, such as dissolution (or recovery) of the program data, is performed on the buffer 39.

The processed program data is delivered from the buffer 39 to an appropriate location in the system memory, such as hard disc drive (external storage device 13) or ROM. Additionally, processing necessary for starting up the program data, such as registration of a program icon to the menu, is automatically done. As a result of installing the program data into the system in this manner, a new virtual environment is constructed automatically on the system.

As a result of the installation, the user desirable setting list is renewed in the next step S10, and the fact that the program data has successfully been installed is reflected in the user desirable setting list 31. For example, the version number of the program data is replaced with the new one on the user desirable setting list 31 so that, when the program data is next down-loaded, the new version program data can be down-loaded.

Figure 8:
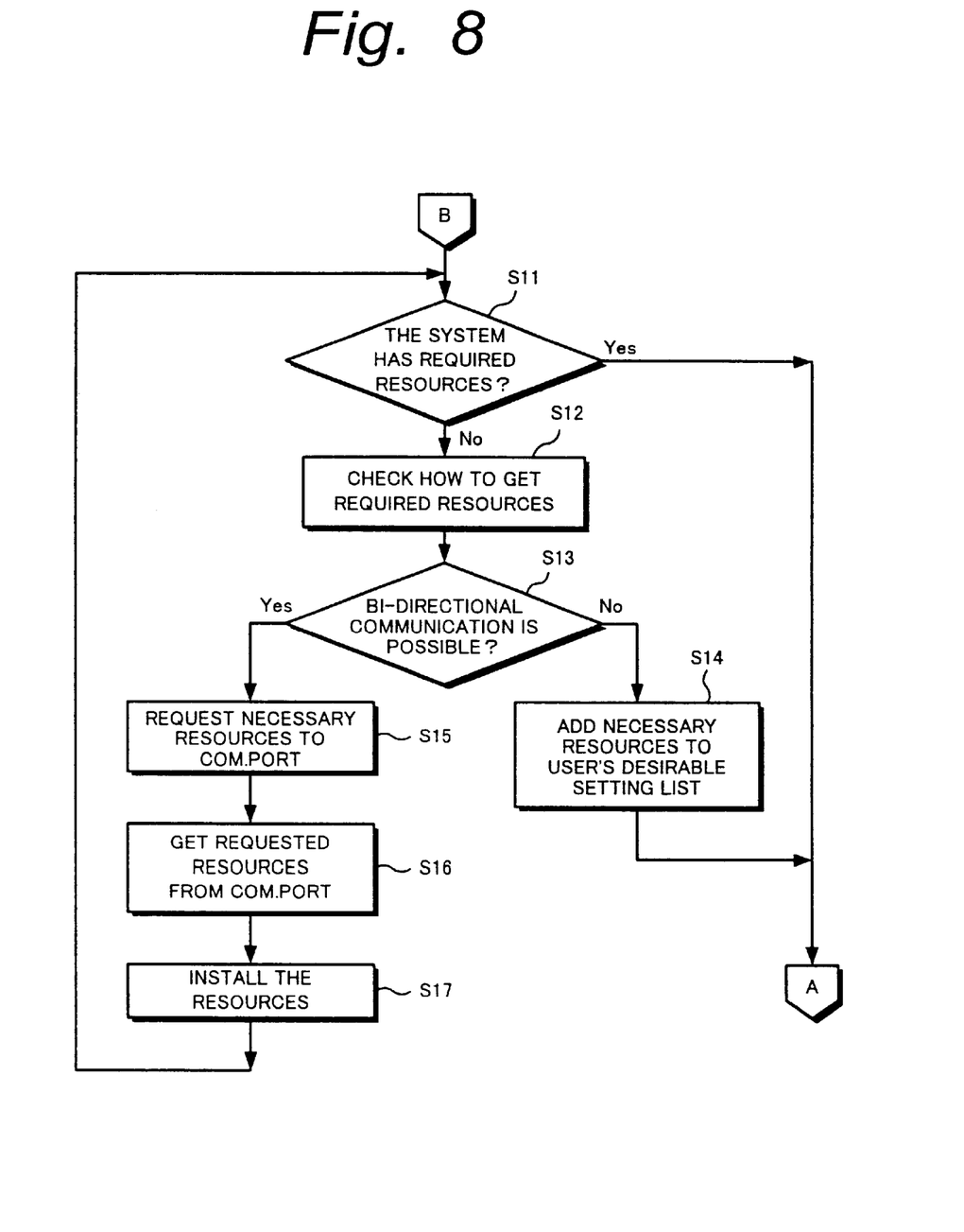
FIG. 8 is a flow chart of a process of down-loading program data according to an embodiment.

Moving to FIG. 8, in step S11, the system resource check portion 42 checks whether the system has software resources necessary for executing the newly installed program in step S9. This may be done, for example, by comparing the "Required Resources" in the program information 21 with the system resources obtained in step S7. For example, it is checked whether device driver software or library software, for example, necessary for executing the program data exist in the system or not.

If all necessary resources are confirmed to exist in the system, the process moves to step S18 (FIG. 7). When down-loading of all program data is completed, then the flow of the process is finished. If it is judged that down-loading of all program data has not been completed, the process returns to step S2 and repeats subsequent steps to down-load the next program data.

On the other hand, if a necessary resource is not found in the system, the process moves to step S12 to start a process for getting the lacking resource. First, in step S13, it is judged whether the system has bi-directional communication means. If the system merely has a satellite broadcasting receiver as its communication means and not available for bi-directional communication, the process moves to step S14.

In step S14, the switch portion 43 is closed, and setting information of the lacking resource is added as new program data information from the virtual environment setting portion 40 to the user desirable setting list 31. It may be performed, for example, following the steps of getting resources set forth in "Request of Resources" in the program information 21 corresponding to the particular program data. If the program information 21 of the lacking resource has already been received and stored in the memory 15, reference is made to the program information 21. Then, the process moves to step S18.

On the other hand, in the case where the system is connected to the network 3 via the modem 34, availability for bi-directional communication is confirmed, and the process moves to step S15. In step S15, a request is given to the communication port 14 to obtain the lacking resource. That is, the switch portion 43 is closed, and based on the process of obtaining resources set forth in the "Request of Resources", the virtual environment setting portion 40 designates the address on the network 3, among others, to the communication port 14. Additionally, in the same manner as described above, if the program information 21 of the lacking resource has already been received and stored in the memory 15, reference is made to the program information 21. According to the designation, the lacking resource is acquired by the communication port 14 (step S16), and the acquired resource is automatically installed in the next step S17. Thereafter, the process returns to step S11.

Although the flow has been explained as using a satellite broadcast to down-load the program information 21 and program data, it is not limited to this example. It will be easy to apply the above explanation to the case where the program information 21 and program data are down-loaded through the network 3, for example.

Also, program data taken as the data transmitted from the sender system 1 in the above explanation is only an example. The data transmitted from the sender system 1 may be any form of data, such as text data, image data like moving images or still images. Also audio data may be transmitted from the sender system 1.

As explained above, according to the invention, program data is automatically down-loaded and installed according to individual program information and one or more individual user desired setting lists, and if a software resource for executing the program data is missing, the missing software is also down-loaded automatically. Therefore, any virtual environment can be renewed to meet with a specific request of a user.

Additionally, according to the invention, since a user desirable setting list is renewed once the program data is down-loaded, updating of a program, for example, is readily done.

Moreover, according to the invention, since only selective portions of program data are down-loaded to meet with skilled levels f users specified in individual user desirable setting lists, different system environments can be made automatically to meet with different skill levels of users.

Further, according to the invention, since program data involving a software resource necessary for starting up a target program is automatically supplied by communication, it requires no recording medium, such as floppy disc or CD-ROM conventionally used for distribution of program data.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A data communication system, comprising:
   a sender system operable to transmit program data and program information, which contains information on said program data, over a communications channel;
   a receiver system operable to receive said program data and said program information, said receiver system including:
   a data capture circuit operable to selectively accept said program data in accordance with said program information and a predetermined virtual environment;
   an install instruction receiver operable to acquire install instructions of said program data from said program information;
   a resource checking unit operable to produce a checking result indicative of whether a needed resource is available for executing said program data; and
   an installation unit responsive to said checking result and operable to: (i) determine whether said program data is usable, (ii) automatically install said program data in accordance with said install instructions when said program data is usable, and (iii) request said needed resource from said sender system over said communications channel when said checking result indicates that said needed resource is not available.

2. The data communication system according to claim 1, wherein said resource checking unit determines whether said resource is necessary for executing said program data with reference to said program information.

3. The data communication system according to claim 1, wherein said receiver system further includes a transmitter operable to transmit a request for said needed resource to said sender system.

4. The data communication system according to claim 1, wherein said program data is updating data for program data already in said receiver system, and a user desirable setting list is updated when said program data is installed.

5. A data communication method, comprising the steps of:
   transmitting program data and transmitting program information, which contains information on said program data, from a sender system to a receiver system over a communications channel;
   receiving said program data and said program information a receiver system;
   selectively downloading said program data in accordance with said program information and a predetermined virtual environment;
   acquiring install instructions for said program data from said program information;
   producing a checking result indicative of whether a needed resource is available for executing said program data;
   determining whether said program data is usable based on said checking result, and automatically installing said program data in accordance with said install instructions when said program data is usable; and
   requesting a needed resource from said sender system over said communications channel when said checking result indicates that said needed resource is not available.

6. A data receiver apparatus configured to receive program data and program information, which contains information on said program data, over a communications channel, the data receiver apparatus comprising:
   a data capture circuit operable to selectively accept said program data in accordance with said program information and a predetermined virtual environment;
   an install instruction receiver operable to acquire install instructions of said program data from said program information;
   a resource checking unit operable to produce a checking result indicative of whether resources are available for executing said program data; and
   an installation unit responsive to said checking result and operable to: (i) determine whether said program data is usable, (ii) automatically install said program data in accordance with said install instructions when said program data is usable, and (iii) request said needed resource from an external system over said communications channel when said checking result indicates that said needed resource is not available.

7. A data receiving method for receiving program data and program information, which contains information on said program data, over a communications channel, the method comprising the steps of:
   selectively downloading said received program data in accordance with said received program information and a predetermined virtual environment;
   acquiring install instructions for said program data from said program information;
   producing a checking result indicative of whether resources are available for executing said program data;

determining whether said program data is usable based on said checking result, and automatically installing said program data in accordance with said install instructions when said program data is usable; and (iii) requesting a needed resource from an external system over said communications channel when said checking result indicates that said needed resource is not available.

8. A receiver for receiving program data and program information over any of a plurality of communications channels, at least one being a bi-directional communications channel and at least one being a uni-directional communications channel, said receiver comprising:

a receiver status list containing information regarding desired program data;

a communications port operable to: (i) receive said program data and program information from any of said communications channels, and (ii) transmit requests over any of said bi-directional communications channels;

a data capture unit operable to accept said program data from said communications port as a function of summary information regarding said program data contained in said program information;

a resource checking unit operable to produce a checking result based on said summary information and said receiver status list indicative of whether said receiver has necessary software resources required to utilize said program data; and a request generating unit operable to produce said requests, said requests being for any necessary software resource that said checking result indicates is unavailable.

9. The receiver of claim 8, wherein said program data and program information are received over said uni-directional communications channel and said request is transmitted over said bi-directional communications channel.

10. The receiver of claim 8, wherein said at least one bi-directional communications channel is an electronic wire line network and said at least one uni-directional communications channel is a satellite communications channel.

11. The receiver of claim 10, wherein said program information includes at least one of: a satellite broadcasting station identifier, a transponder number, a channel number, a time of satellite transmission, and a duration of satellite transmission, when said program data may be received over said at least one uni-directional communications channel.

12. The receiver of claim 8, wherein said program information includes a required skill level of a user of said program data, said skill level being taken from a group consisting of advanced, intermediate, and beginner.

\* \* \* \* \*

UNITED STATES PATENT AND TRADEMARK OFFICE
CERTIFICATE OF CORRECTION

PATENT NO.   : 6,286,037 B1
DATED        : September 4, 2001
INVENTOR(S)  : Yoko Matsuura It is certified that error appears in the above-identified patent and that said Letters Patent is hereby corrected as shown below:

Title page,
Item [57], line 13, change "communication" to -- communications --.

Column 5,
Line 21, change "The," to -- The --.

Column 6,
Line 66, change "5(" to -- 5, --.

Column 7,
Line 10, after "level." insert new paragraph.
Line 31, change "Tf" to -- If --.

Column 9,
Line 28, change "27" to -- 37 --.

Column 12,
Line 16, change "information" to -- information in --.

Signed and Sealed this

Twelfth Day of March, 2002

Attest:

*Attesting Officer*

JAMES E. ROGAN
*Director of the United States Patent and Trademark Office*